(12) United States Patent  
D'Errico (10) Patent No.: US 6,434,637 B1
(45) Date of Patent: Aug. 13, 2002

(54) METHOD AND APPARATUS FOR BALANCING WORKLOADS AMONG PATHS IN A MULTI-PATH COMPUTER SYSTEM BASED ON THE STATE OF PREVIOUS I/O OPERATIONS

(75) Inventor: Matthew J. D'Errico, Southborough, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 09/223,998

(22) Filed: Dec. 31, 1998

(51) Int. Cl.[7] .......................... G06F 13/14; G06F 13/20
(52) U.S. Cl. .................. 710/38; 710/5; 710/6; 710/15; 710/36; 710/37; 711/118
(58) Field of Search .................. 710/5, 36, 37, 710/38, 15, 6; 711/118

(56) References Cited

U.S. PATENT DOCUMENTS

| | | | |
|---|---|---|---|
| 4,001,784 A | * 1/1977 | Bardotti | 340/172.5 |
| 4,368,513 A | 1/1983 | Meltzer | |
| 4,490,785 A | * 12/1984 | Strecker et al. | 364/200 |
| 4,577,272 A | 3/1986 | Ballew et al. | |
| 4,680,773 A | 7/1987 | Amundson | |
| 4,858,108 A | * 8/1989 | Ogawa et al. | 364/200 |
| 5,163,131 A | 11/1992 | Row et al. | |
| 5,311,578 A | 5/1994 | Bremer et al. | |
| 5,448,566 A | 9/1995 | Richter et al. | |
| 5,463,661 A | 10/1995 | Moran, III et al. | |
| 5,608,764 A | 3/1997 | Sugita et al. | |
| 5,644,573 A | 7/1997 | Bingham et al. | |
| 5,715,277 A | 2/1998 | Goodson et al. | |
| 5,751,914 A | 5/1998 | Coley et al. | |
| 5,796,808 A | 8/1998 | Scott et al. | |
| 5,995,511 A | * 11/1999 | Zhou et al. | 370/412 |
| 6,034,946 A | * 3/2000 | Roginsky et al. | 370/238 |
| 6,145,028 A | * 11/2000 | Shank et al. | 710/31 |
| 6,230,229 B1 | * 5/2001 | Van Krevelen et al. | 710/131 |

FOREIGN PATENT DOCUMENTS

| | | |
|---|---|---|
| EP | 0 7609 988 A2 | 5/1996 |
| WO | WO 91/14229 | 9/1991 |
| WO | WO 97/04384 | 2/1997 |

OTHER PUBLICATIONS

Patent Abstracts of Japan, Publication No. 10301870, Nov. 13, 1998.
"Dynamic I/O Load Balance Task Dispatching Algorithms", IBM Technical Disclosure Bulletin, vol. 18, No. 8, Jan. 1976.
Patent Abstracts of Japan, Publication No. 10107846, Apr. 24, 1998.
Annex to Form PCT/ISA/206, Communication Relating to the Results of the Partial International Search.

* cited by examiner

*Primary Examiner*—Jeffrey Gaffin
*Assistant Examiner*—Rehana Perveen
(74) *Attorney, Agent, or Firm*—Wolf, Greenfield & Sacks, P.C.

(57) ABSTRACT

A method and apparatus for distributing input/output (I/O) operations among at least two paths in a multi-path computer system including a host computer, a system resource and a plurality of paths coupling the host computer to the system resource. For a next I/O operation to be assigned for transmission between the host computer and the system resource, a selection is made of one of the at least two paths for transmission of the next I/O operation based upon a state of previously assigned I/O operations queued for transmission over the at least two paths.

50 Claims, 3 Drawing Sheets

METHOD AND APPARATUS FOR BALANCING WORKLOADS AMONG PATHS IN A MULTI-PATH COMPUTER SYSTEM BASED ON THE STATE OF PREVIOUS I/O OPERATIONS

FIELD OF THE INVENTION

The present invention is directed to multi-path computer systems, and more particularly, to a method and apparatus for balancing workloads among the multiple paths in such a computer system.

DESCRIPTION OF THE RELATED ART

Figure 1:
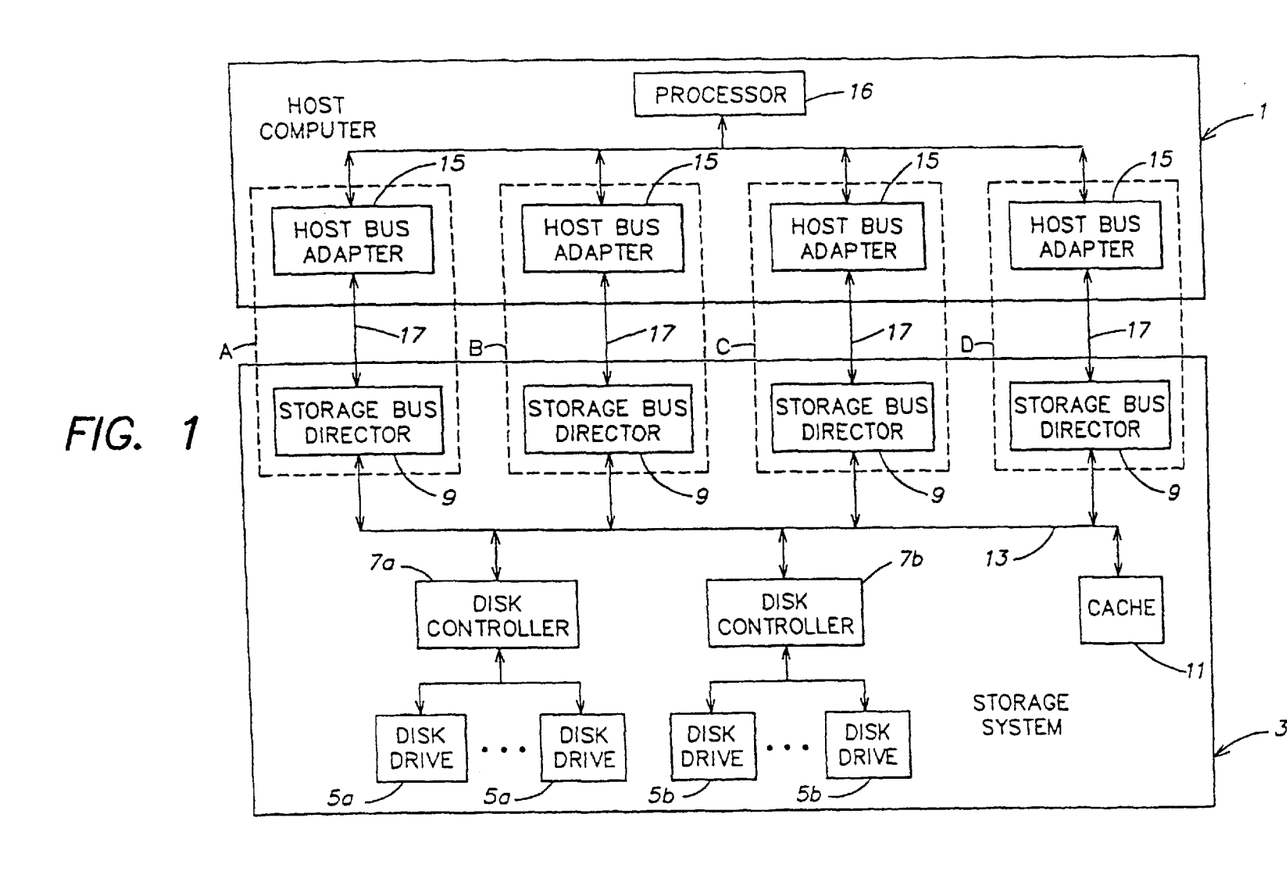
FIG. 1 is a block diagram of an exemplary multi-path computing system on which aspects of the present invention can be implemented.

Many computer systems include one or more host computers and one or more system resources with which the host computers communicate. An example of such a system is shown in FIG. 1, and includes a host computer 1 and a system resource (i.e., a storage system 3) with which the host computer 1 communicates to store and retrieve data used by the host computer 1.

The storage system 3 includes a plurality of storage devices on which data is stored. In the exemplary system shown in FIG. 1, the storage system includes a plurality of disk drives 5a–5b, and a plurality of disk controllers 7a–7b that respectively control access to the disk drives 5a and 5b. The storage system 3 further includes a plurality of storage bus directors 9 that control communication with the host computer 1 over communication buses 17. The storage system 3 further includes a cache 11 to provide improved storage system performance. In particular, when the host computer 1 executes a read from the storage system 3, the storage system 3 may service the read from the cache 11 (when the data is stored in the cache), rather than from one of the disk drives 5a–5b, to execute the read more efficiently. Similarly, when the host computer 1 executes a write to the storage system 3, the corresponding storage bus director 9 can execute the write to the cache 11. Thereafter, the write can be destaged asynchronously, in a manner transparent to the host computer 1, to the appropriate one of the disk drives 5a–5b. Finally, the storage system 3 includes an internal bus 13 over which the storage bus directors 9, disk controllers 7a–7b and the cache 11 communicate.

The host computer 1 includes a processor 16 and one or more host bus adapters 15 that each controls communication between the processor 16 and the storage system 3 via a corresponding one of the communication buses 17. It should be appreciated that rather than a single processor 16, the host computer 1 can include multiple processors. Each bus 17 can be any of a number of different types of communication links, with the host bus adapter 15 and the storage bus directors 9 being adapted to communicate using an appropriate protocol for the communication bus 17 coupled therebetween. For example, each of the communication buses 17 can be implemented as a SCSI bus, with the directors 9 and adapters 15 each including a SCSI driver.

Multiple communication paths typically have been provided for one of two reasons. First, multiple communication paths provide some fault tolerance in the event that one of the communication paths between the host computer 1 and the system resource (e.g., the storage system 3) experiences a failure. Thus, in some computer systems, only a single communication path is operational at any particular time, but at least one additional path is provided and becomes operational if the primary path experiences a failure.

In other computer systems, multiple communication paths are provided to enhance system performance. In such systems, the multiple communication paths are operated simultaneously, so that multiple communication operations between the host computer 1 and the system resource (e.g., the storage system 3) can be performed simultaneously to enhance system performance.

In systems wherein multiple communication paths are employed simultaneously, a simple round robin technique has conventionally been employed for balancing the activity over the multiple paths. In particular, a first operation between the host computer 1 and the resource (e.g., the storage system 3) is performed over a first of the communication paths (e.g., path A in FIG. 1), the next operation is performed using a next communication path (e.g., path B), and so on until an operation has been performed using each of the communication paths. At that point, the round robin technique wraps around and begins again by transmitting the next operation over the first communication path (e.g., path A). Thus, in the illustrated system of FIG. 1, a series of consecutive communication operations between the host computer 1 and the storage system 3 would be performed respectively over the following sequence of paths: A, B, C, D, A, B, C, D, ... A, B, C, D.

Applicants have discovered that the conventional round robin technique does not maximize system performance. Thus, it is an object of the present invention to provide an improved method and apparatus for balancing activity between multiple paths in a multi-path computer system.

SUMMARY OF THE INVENTION

One illustrative embodiment of the invention is directed to a method for distributing input/output (I/O) operations among at least two paths in a multi-path computer system including a host computer, a system resource and a plurality of paths coupling the host computer to the system resource. The method comprises a step of, for a next I/O operation to be assigned for transmission between the host computer and the system resource, selecting one of the at least two of the plurality of paths for transmission of the next I/O operation based upon a state of previously assigned I/O operations queued for transmission over the at least two of the plurality of paths.

Another illustrative embodiment of the invention is directed to a host computer for use in a multi-path computer system including a system resource and a plurality of paths coupling the host computer to the system resource. The host computer comprises a driver to distribute input/output (I/O) operations initiated by the host computer among at least two of the plurality of paths for transmission to the system resource, the driver selecting, for a next I/O operation to be assigned for transmission from the host computer to the system resource, one of the at least two of the plurality of paths based upon a state of previously assigned I/O operations queued for transmission to the system resource over the at least two of the plurality of paths.

DETAILED DESCRIPTION

Applicants have discovered that the round robin technique employed in conventional multi-path systems does not make effective use of the multiple system paths, and therefore, does not maximize system performance. In particular, the basic assumption in a round robin system is that every I/O operation performed over a path between the host computer 1 and the system resource (e.g., the storage system 3) will have the same execution time, so that if I/O operations are evenly distributed across the multiple system paths, each of the system paths will be used equally, thereby maximizing system performance. However, Applicants have discovered that this underlying assumption is incorrect, and that different I/O operations take different amounts of time to complete, such that the use of a round robin balancing technique will not evenly balance the activity performed over multiple system paths, and will result in some paths not being utilized to their full capacity.

Figure 2:
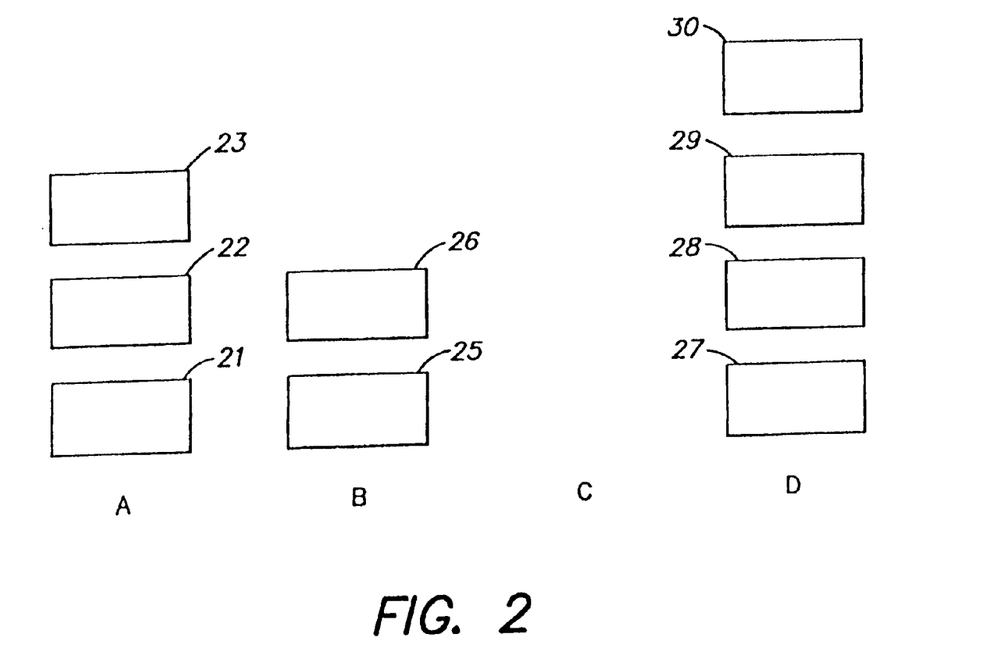
FIG. 2 is a schematic representation of a plurality of paths each with different numbers of queued input/output (I/O) operations.

In view of the foregoing, one aspect of the present invention is directed to a method and apparatus for intelligently balancing the activity performed over multiple system paths to increase system performance. As discussed in detail below, Applicants have discovered that there are numerous factors that impact how quickly a series of I/O operations will be performed over any one of multiple paths in a multi-path computer system. As a result, if I/O operations are distributed evenly amongst the multiple paths in a multi-path computer system in accordance with the round robin technique, situations can develop wherein the I/O operations assigned to some paths complete more quickly than others. As a result, relatively lengthy queues of I/O operations can develop for some of the multiple system paths, while other paths are empty. An example of this is shown in FIG. 2, wherein three I/O operations 21–23 are queued to path A, two I/O operations 25–26 are queued to path B and four I/O operations 27–30 are queued to path D, while path C is empty. It should further be appreciated that this distribution of I/O operations across the multiple paths may be independent of the order in which I/O operations have most recently been assigned to the multiple paths. For example, path C may be empty despite being the path to which the most recently distributed I/O operation has been assigned.

In view of the foregoing, in one embodiment of the present invention, preference is given to distributing each I/O operation to the one of the multiple system paths that is determined to be the shortest path for that I/O operation, i.e., the path is selected over which the I/O operation is expected to complete most quickly. The selection of a path for an I/O operation is based upon the status of those previously assigned I/O operations queued to the multiple system paths at the time the selection is made. Applicants have developed a number of different criteria that can be employed for selecting the shortest path for a particular I/O operation. In various embodiments of the present invention, each of these criterion can be used separately. Alternatively, in another embodiment of the invention discussed below, each of these factors can be combined to optimize the selection of a path for a particular I/O operation with weighting factors being assigned to each of the selection criteria.

In one embodiment of the present invention, the criteria used for selecting the shortest path for a particular I/O includes an evaluation of the number of I/O operations queued to each of the multiple paths. This embodiment of the invention can be explained referring to the illustrative example of FIG. 2, in which three I/O operations are queued to path A, two I/O operations are queued to path B, path C is empty and four I/O operations are queued to path D. Using the criteria of the smallest number of I/O operations pending for any of the multiple paths, path C would obviously be selected since it is empty and the I/O operation sent to it could proceed immediately. If the computer system employed only three paths including paths A, B and D, path B would be selected using this criterion because it employs the smallest number of I/O operations.

It should be appreciated that the embodiment of the present invention that includes the selection of a path based upon the number of queued I/O operations provides an advantage over the round robin technique of the prior art, wherein path selection is not done using any intelligent selection criteria based upon the status of those I/O operations queued to the multiple system paths at the time the selection is made. As a result, using the round robin technique, an I/O operation may well be sent to a path including a large queue of pending I/O operations, which will result in the I/O operation taking a longer time to complete than if the selection criterion according to this embodiment of the present invention were employed.

It should be appreciated that the embodiment of the present invention relating to selecting a path based upon the number of queued I/O operations can be implemented in a straightforward fashion in the host computer 1, and that the present invention is not limited to any particular manner of implementation. For example, the processor 16 in most computer systems will include a filter driver that is responsible for distributing I/O operations among the host bus adapters 15. The filter driver can simply query each of the host bus adapters 15 to determine how many I/O operations are queued on each, and can distribute a next I/O operation to the path with the smallest number of queued I/O operations.

One premise underlying the embodiment of the present invention relating to the selection of a path based upon the number of queued I/O operations is the assumption that each I/O operation will take the same amount of time to complete. Applicants have discovered that this assumption is not accurate. There are three basic factors that impact the length of time to complete an I/O operation between the host computer 1 (FIG. 1) and a system resource such as the storage system 3. These three factors include: (1) the arbitration time taken to establish a connection between the host computer 1 and the system resource over a particular path; (2) the data access time for the resource to respond once it receives an I/O request over one of the paths; and (3) the transfer time for the data transmitted between the host computer 1 and the system resource over the communication bus 17 used to implement a particular path.

Figure 3:
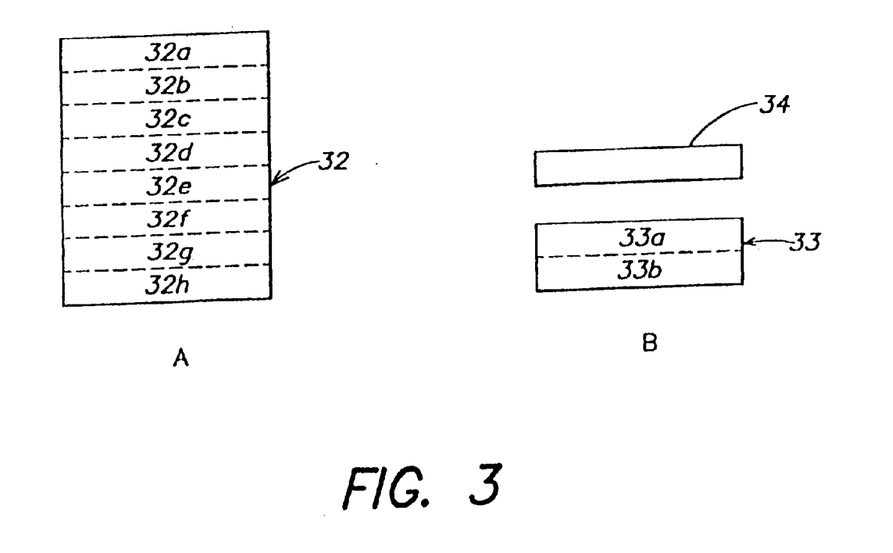
FIG. 3 is a schematic representation of a pair of paths including queued I/O operations having different numbers of data blocks.

In an alternate embodiment of the present invention, rather than simply looking to the number of I/O operations queued over each path, the number of data blocks to be transferred by the collection of queued I/O operations for each path is considered, as this will impact the data transfer time for the collection of I/O operations queued to each path. FIG. 3 illustrates this point by showing two paths A and B, with path A having a single I/O operation 32 queued thereon and path B including two queued I/O operations 33 and 34. If the above-described selection criterion relating to the number of queued I/O operations was used exclusively to choose between paths A and B, path A would be selected since it includes a fewer number of I/O operations. However, as shown in FIG. 3, I/O operation 32 queued on path A includes eight blocks of data (i.e., blocks 32a–32h), whereas the I/O operations queued to path B collectively include only three data blocks (i.e., data blocks 33a and 33b in I/O operation 33, and a single data block in I/O operation 34). Thus, if paths A and B include the same data transfer rate, the two I/O operations queued to path B will actually take less data transfer time than the single I/O operation queued to path A. Thus, in accordance with one illustrative embodiment of the invention, the next I/O operation would be queued to path B, with the expectation that the fewer number of queued data blocks will result in the next I/O operation completing more quickly over path B than it would over path A.

In another alternate embodiment of the present invention, additional information concerning the particular type of communication bus 17 (FIG. 1) employed over each path is added to the selection criteria. It should be appreciated that in a computer system such as that shown in FIG. 1, different types of communication buses 17 can be employed to form the various paths A–D, such that each path need not be implemented with the same type of communication bus 17. In addition, it should be appreciated that the data transfer rates and arbitration times for various communication buses can vary widely. For example, typical communication links that can be used to implement the buses 17 for paths A–D between the host computer 1 and a system resource include Fibre Channel, Fast Wide and Ultra SCSI. Fibre Channel includes a data transfer rate of approximately 100 megabytes/second and an arbitration time of approximately 40 microseconds, Fast Wide includes a data transfer rate of approximately 20 megabytes/second and an arbitration time of approximately 200 microseconds, and Ultra SCSI includes a data transfer rate of approximately 40 megabytes/second and an arbitration time of approximately 160 microseconds. Thus, it should be appreciated that the data transfer rate over a Fibre Channel connection used to implement the communication bus 17 for one of the paths A–D will be five times as fast as that for another one of the paths implemented using Fast Wide. Referring to the illustrative example of FIG. 3, if path A was implemented using Fibre Channel and path B was implemented using Fast Wide, the data transfer time for the eight data blocks queued to path A will be less than that for the three data blocks queued to path B. Thus, selecting between these paths based solely upon the number of queued data blocks will not achieve the purpose of selecting the shortest path possible for the next I/O operation. Thus, in an alternate embodiment of the present invention, the particular technology used to implement a communication path is added to the selection criteria. In this embodiment of the present invention, the number of I/O operations queued to each path is taken into consideration, along with the number of data blocks represented thereby and the arbitration time and data transfer rate for each of the paths. Using these three pieces of information, a selection can be made for the path that will provide the shortest combined time for arbitrating for each of the queued I/O operations and transferring the data blocks represented thereby.

As discussed above, in addition to the arbitration and data transfer time, another factor that influences how quickly the I/O operations queued to a particular path will complete is the time for each I/O operation to access the target data within the system resource (e.g., the storage system 3 in FIG. 1). Thus, in another alternate embodiment of the present invention, the access time for the I/O operations queued to the multiple system paths are included in the criteria for selecting the shortest path for the next I/O operation. In this respect, an assumption underlying the conventional round robin technique is that each I/O operation will experience the same access time for the system resource. Applicants have discovered that this assumption does not hold true, and can drastically impact the performance of a multi-path computer system if not taken into consideration when balancing the workload between the multiple paths.

One illustrative system wherein the load balancing techniques of the present invention can be employed is the computer system of FIG. 1, wherein the resource connected to the host computer 1 is a storage system 3 including a plurality of disk drives 5a–5b. As discussed above, the storage system 3 also includes a cache 11 that is used to improve the storage system performance. In particular, when the host computer 1 executes a read from or a write to the storage system 3, the storage system may service the read or write from the cache 11 (when there is a hit for the desired data in the cache). Thus, when a read hits in the cache, it can be performed more quickly than if the read misses in the cached and is required to access the targeted one of the disk drives 5a–5b. Similarly, when a write misses in the cache, some data in the cache must typically be destaged to the disk drives to make room for the new data to be written to the cache, thereby slowing down the operation.

It should be appreciated from the foregoing that in a cached storage system such as that shown in FIG. 1, I/O operations (either reads or writes) that hit in the cache 11 have a significantly quicker data access time than those that miss. That is, from the perspective of the host computer 1, the data access time for the storage system 3 is much quicker for I/O operations that hit in the cache than for those that miss. This difference in access time can be significant. For example, one example of a cached storage system such as that shown in FIG. 1 is the SYMMETRIX line of disk arrays available from EMC Corporation, Hopkinton, Mass. The SYMMETRIX line of disk arrays generally experiences access times ranging between 3 milliseconds (ms) and 12 ms, with the low end of the range corresponding to cache hits and the high end corresponding to cache misses. Thus, there can be a 300% differential in the access time between I/O operations transmitted from the host computer 1 to the storage system 3.

In view of the foregoing, it should be appreciated that the assumption that the access time for a particular resource will be the same for all I/O operations will not always hold true. Thus, in one alternate embodiment of the invention, the selection criteria used for determining which path should be utilized for a next I/O operation includes an analysis of the expected data access time for the I/O operations queued to each path. It should be appreciated that the description of a cached storage system such as that shown in FIG. 1 is provided merely for illustrative purposes, and that the aspect of the present invention relating to the consideration of resource access time is not limited to this or any other type of computer system, as there are many types of computer system resources wherein the access time will vary from one operation to another.

Figure 4:
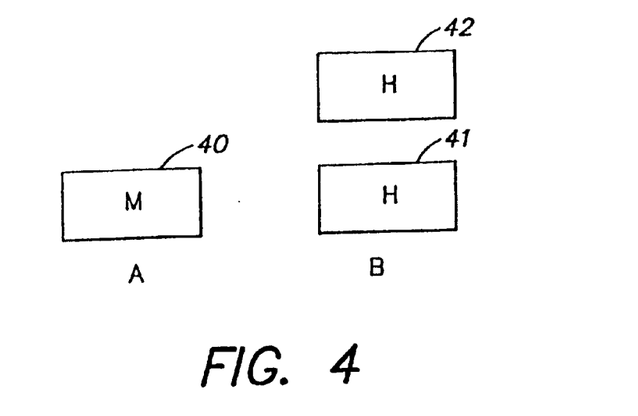
FIG. 4 is a schematic representation of a pair of paths including I/O operations that will miss or hit in a cached system.

It should be appreciated that the data access times for any I/O operations queued to the multiple system paths can have a significant impact on the selection of the quickest path for performing a next I/O operation. For example, referring to FIG. 4, two paths A and B are illustrated, with path A including a single I/O operation 40 that will miss in the cache 11 (FIG. 1), and path B including a pair of queued I/O operations 41 and 42, each of which will hit in the cache 11. Despite the fact that there are more I/O operations queued to path B, given the fact that the miss operation on path A may take four times as long to perform within the storage system 3 (FIG. 1) as either of the I/O operations queued to path B, path B may be the better choice for most quickly performing the next I/O operation to be queued for transmission between the host computer 1 and the storage system 3. Thus, in accordance with one illustrated embodiment of the invention, the access time for the I/O operations queued to the multiple paths is taken into consideration in selecting the shortest path for a next I/O operation.

As discussed above, the selection of which path is to be employed when accessing a system resource is performed by the host computer 1 (e.g., in a filter driver implemented in software executed on processor 16). For some applications, the host computer 1 may not have sufficient information to precisely determine the access time for each queued I/O operation. For example, in the illustrative system shown in FIG. 1 wherein the system resource is a cached storage system, the host processor 1 cannot tell for certain whether any data I/O operation will hit or miss in the cache. Nevertheless, the host computer 1 can make some reasonably accurate predictions based upon historical information. In this respect, the host computer 1 controls the initiation of I/O operations with the storage system 3. Thus, the host computer 1 can monitor the performance time for each I/O operation, and based upon its completion time, can determine whether the operation hit or missed in the cache. Thus, over time for a particular application, a percentage can be determined for the number of I/O operations that can be expected to hit or miss in the cache. In addition, Applicants have discovered that for almost all applications, writes from the host computer 1 to the storage system 3 are more likely to hit in the cache 11 than reads. In particular, for applications wherein the I/O operations are approximately evenly distributed between reads and writes, writes can be assumed to hit in the cache approximately 99% of the time. Conversely, for applications wherein the I/O operations are more heavily weighted toward write operations, the hit rate is lower (approximately 70%). The number of hits for reads is not as uniform, and will vary more significantly from application to application. Applicants have also discovered that for cache hits in the SYMMETRIX line of disk arrays, reads are approximately 30% faster than writes, since writes to the cache perform a lock on the mechanism used to implement the cache replacement scheme.

In view of the foregoing, in one embodiment of the present invention adapted for use in a computer system including a cached storage system 3, the selection of the shortest path for a next I/O operation includes a consideration of the percentage breakdown of I/O operations for each path between reads and writes, as well as a consideration of the estimated hit ratios for the particular application for both reads and writes. These selection criteria can be used alone, or can be factored in with each of the other selection criteria discussed above. As mentioned previously, the specific discussion included herein relating to the differences in access time between reads and writes and between cache hits and misses is provided merely for illustrative purposes, as the aspect of the present invention related to considering data access time in the selection criteria is not limited to use in balancing activity over multiple paths between a host computer and a cached storage system, and can be used in other types of multi-path computer systems.

In a further embodiment of the present invention, the selection criteria can be adjusted based upon discrepancies between the historical data access time ratio for an application and a most recent batch of I/O operations. For example, if an application historically includes a read hit rate of approximately 80%, and a most recent batch of I/O operations hit the cache at only 60%, the selection algorithm can more heavily weight the next batch of I/O operations with the expectation that the hit rate will exceed the 80% historical mark to compensate for the recently monitored low 60% rate. Of course, if the application deviates from the historical data access time ratio over any significant period of time, the host computer 1 can update its historical database to more accurately reflect the manner in which the application is operating.

As should be appreciated from the foregoing, in various embodiments of the present invention, several selection criteria can be employed together to determine the path to be used for a next I/O operation. This can be done in any of numerous ways, as the present invention is not limited to any particular manner of implementation. For example, a software entity can be used to perform the selection function, and can implement a number of decision steps (e.g., using "if, then, else" statements) to balance the various selection criteria. However, in accordance with one illustrative embodiment of the invention, a weighting formula is employed that provides a distinct weighting coefficient for each of the selection criteria, so that the path selection process can be performed more efficiently when implemented in software.

An example of a technique for employing a weighting formula to implement the selection criteria would apply a weighting factor W to each of the available paths. In determining the path to be selected for a next I/O operation, each of the path weighting factors would be considered, and the path having the lowest weighting factor W for the particular I/O operation would be selected. The weighting factor for each path can be determined in any of numerous ways, using one or more of the selection criteria discussed above. For example, one illustrative formula for determining the weighting factor W of each path is as follows:

$$W = (icoeff \times no\_of\_ios) + (wcoeff \times no\_of\_write\_blocks) +$$
$$(rcoeff \times no\_of\_read\_blocks), \text{ wherein:}$$

icoeff is a coefficient constant relating to the overhead associated with an I/O operation;

wcoeff is a coefficient constant relating to write operations per block of data; and rcoeff is a coefficient constant relating to read operations per block of data.

It should be appreciated that by employing a weighting formula as described above, the selection process for a next I/O operation is computationally simple, as the selection process can simply compare the weighting factors for each of the available paths to select the path having the lowest weighting factor W. Furthermore, it should be appreciated that the selection criteria discussed above can be factored into the constants provided for the various weighting coefficients icoeff, wcoeff and rcoeff. For example, the selection criteria relating to the performance of the particular technology used to implement each of the communication paths can be incorporated into these coefficients, so that the coefficients can differ between paths implemented using different technology. In addition, the factors relating to the predicted miss and hit ratios in a cached system can also be factored into the read and write coefficients (rcoeff and wcoeff, respectively). The particular constants for the coefficients will depend not only upon which of the above-described selection criteria are incorporated therein, but also upon the particular performance characteristics of the specific multipath computer system. For example, it should be appreciated that the relative performance of a read versus a write operation, as well as the relative penalty incurred for a cache miss, will vary significantly from system to system. Thus, the particular values for the coefficients may vary widely, and the present invention is not limited to any particular coefficient values.

In another embodiment of the present invention, the selection criteria for a particular I/O operation is influenced by the device in the system resource (e.g., a particular disk drive 5a–5b in the storage system 3 of FIG. 1) that is targeted by the I/O operation. Applicants have surprisingly found that there is a point beyond which the spreading of I/O operations targeting the same device across multiple paths actually diminishes system performance, rather than achieving the increased performance normally expected when performing operations in parallel. Referring again to the illustrative system shown in FIG. 1, it should be appreciated that when a particular one of the disk drives 5a–5b is involved in an I/O operation over one of the paths A–D, the disk drive is locked to that particular path so that the I/O operation can be completed without being interrupted by another I/O operation, over a different one of the paths A–D, targeting the same disk drive. Such an interruption could result in the corruption of data relating to the first I/O operation. As a result of the locking feature, an I/O operation over one of the multiple paths (e.g., path B) cannot access one of the disk drives until the completion of a previous I/O operation that targets the same disk drive over a different path (e.g., path A). Thus, there is a time penalty incurred in moving the lock for a particular disk drive from one of the paths A–D to another. This time penalty relates, at least in part, to an arbitration time for the multiple I/O paths attempting to gain control of the locks, which arbitration time increases with the number of paths attempting to gain control of the lock. Applicants have discovered that at some number of parallel operations, the time to move the lock between different paths may outweigh any advantage achieved by simultaneously queuing multiple I/O operations to the same disk drive across different paths. Thus, in some instances, it may be advantageous to restrict the I/O operations targeting a particular device to a limited number of paths, even if those paths are busy with other I/O operations. In the SYMMETRIX line of disk arrays, it has been found that limiting the number of paths used to send I/O operations targeting the same device to two or three paths provides optimal performance. It should be appreciated that this selection criterion is based on a specific characteristic (i.e., the target device) that will vary from one I/O operation to another, such that the quickest path selected for one I/O operation might differ from the path that would be selected for a different I/O operation.

The SYMMETRIX line of disk arrays includes a feature that allows portions of a single one of the disk drives 5a–5b to be locked to different paths at the track level, such that different tracks within the same device can be locked to different paths. This allows the device to accept multiple I/O operations simultaneously from different paths, without concern for the lock delay discussed above. Using this feature of SYMMETRIX, the diminishing return associated with multiple I/O operations directed to the same device does not occur until more than eight paths are used to send I/O operations to a single device.

Another advantage of considering the target device for an I/O operation when assigning it to a particular path relates to the fact that the performance of I/O operations targeting a particular device (e.g., a particular one of the disk drives 5a–5b) is inherently limited by the performance of the target device itself. Thus, once a set of I/O operations targeting a particular device has been distributed among multiple paths so that the bandwidth through these multiple paths equals that of the target device itself, increasing the bandwidth through the paths A–D will not achieve any increased system performance. In fact, doing so will result in additional I/O operations having to wait for access to the particular target device, and may unnecessarily tie up some of the multiple system paths. For example, if a series of I/O operations are to be executed to a particular one of the disk drives 5a–5b and the use of two of the paths A–D is sufficient to achieve the bandwidth of the disk drive, distributing the I/O operations among all four of paths A–D will result in some of the I/O operations having to wait until others have completed. This is inefficient, as all of the I/O operations targeting the same device could alternatively be queued to two of the paths (e.g., paths A and B), enabling the other two paths to be used for I/O operations directed to different target disk drives.

In view of the foregoing, one embodiment of the present invention takes into consideration the target device for a particular I/O operation when selecting the quickest path for executing that I/O operation. It should be appreciated that this feature of the present invention is not limited to use with a computer system wherein the system resource is a storage system as recited above. Rather, the computer system shown in FIG. 1 is merely one example of a system in which this aspect of the present invention can be employed, and it should be understood that taking the target device for a particular I/O operation into consideration can be advantageous in other types of computer systems. As with a number of the other selection criteria discussed above, the embodiment of the present invention relating to considering the target device for the next I/O operation can be used alone, or in combination with the other selection criteria discussed above.

The embodiment of the present invention that takes into consideration the target device for a particular I/O operation can be implemented in any of numerous ways, as the present invention is not limited to any particular implementation technique. In accordance with one illustrative embodiment of the invention, the selection criteria relating to the particular target device is implemented in conjunction with the above-described weighting factor W applied to each of the paths. In particular, each target device can be provided with a threshold number that defines a limit on the number of paths that should be used at any one time to source pending I/O operations to the target device. In this respect, information can be stored that identifies each of the target devices to which pending I/O operations are directed, as well as the paths selected to transmit those I/O operations. When a path is to be selected for a next I/O operation, the above-described weighting factor W can be employed to select a path with the lowest weighting factor. Thereafter, a determination can be made as to whether the transmission of the next I/O operation over the selected path would exceed the threshold for the target device. If not, that path is selected.

If the path with the lowest weighting factor W would result in the number of paths used to source I/O operations to the target device exceeding the threshold number, the path with the next lowest weighting factor is selected. In this manner, the path selected for the next I/O operation will be the path that has the lowest weighting factor W among those paths that will not result in a violation of the threshold number for the target device.

In another embodiment of the present invention, priority is given to certain types of I/O operations that are critical to the performance of the application with which they are associated. In particular, the conventional round robin technique attempts to maximize the performance of the system resource (e.g., the storage system 3 in FIG. 1) by keeping the resource as busy as possible. Applicants have discovered that for some applications executing on the host computer 1, giving priority to certain I/O operations will maximize the performance of the application. Thus, prioritizing certain operations can be equally or more important than maximizing the business of the system resource.

Figure 5:
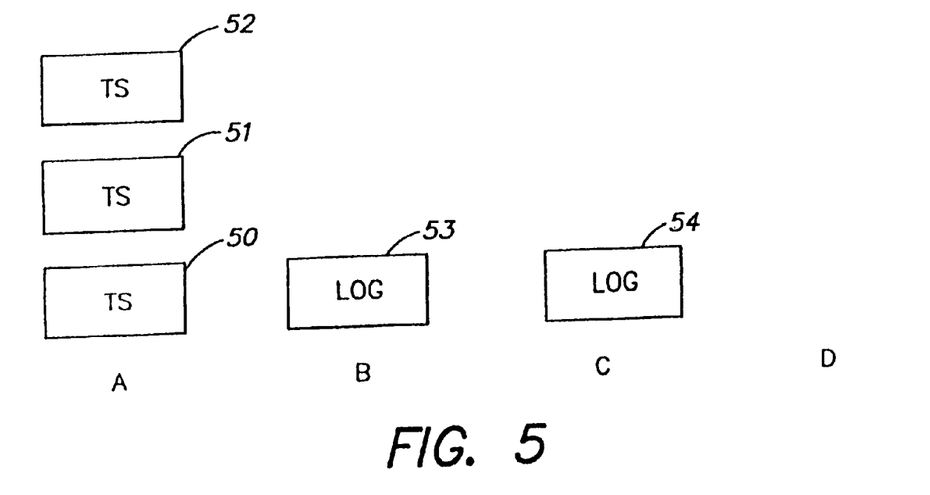
FIG. 5 is a schematic representation of a multiple path system with priority being given to certain types of I/O operations.

One example of the manner in which operations can be prioritized relates to an order entry application run by a retail organization that receives telephone orders. For the retailer, the goal is to enable its operators to take orders as quickly as possible, thereby maximizing the number of orders the retailer can process in a particular time period. Such order entry applications typically run on a computer system such as that shown in FIG. 1, and store order information in a database including three components, i.e., tables, indices and logs. The performance of a database for an order entry application is based solely on the performance in updating the logs. That is, the database first commits a transaction to the log, and then later updates the tables and indices. From the perspective of database performance, a transaction is completed once the logs have been updated, even if the tables and indices have not. Thus, in accordance with one embodiment of the present invention, priority is given to all log updates in an order entry application. An example of this is shown in FIG. 5, wherein three I/O operations 50–52 are queued on path A and relate to table space updates, a single I/O operation 53 representing a log update is queued to path B, a single I/O operation 54 representing a log update is queued to path C, and path D is empty. If the next I/O operation were a log update, that update would preferably be assigned to path D to allow it to complete as quickly as possible. However, if the next I/O operation were a table space update, that I/O operation might be assigned to path A so that path D could be kept clear for future log updates. Thus, for an I/O operation representing a table space update, the I/O operation might be assigned to a path which will not result in its completion as quickly as possible, but which will maximize the overall performance of the application.

It should be appreciated that the embodiment of the present invention relating to prioritizing certain I/O operations is not limited to the order entry application discussed above, and can be employed with any application wherein certain I/O operations are more critical to the overall performance of the application than others. In addition, it should be appreciated that there can be various levels of priority given to different types of I/O operations, with each receiving a different weighting factor to be considered in the process for selecting an appropriate one of the multiple paths A–D. This selection criterion can be used separately, or in combination with one or more of the selection criteria discussed above.

As with the embodiments described above, the use of a priority scheme to prioritize certain I/O operations can be implemented in any of numerous ways, as the present invention is not limited to any particular manner of implementation. It should be appreciated that in many computer systems, certain types of I/O operations will be directed to specific target devices (e.g., logical volumes). This is taken into consideration when implementing the above-described priority scheme in accordance with one illustrative embodiment of the invention. In particular, the priority scheme can be implemented by giving priority to certain target devices which are known to be the targets of I/O operations that are critical to the performance of the application with which they are associated. However, it should be appreciated that the present invention is not limited in this respect, and that the prioritization aspect of the present invention can be implemented in other ways to assign priority directly to certain I/O operations, rather than to the target devices to which they are directed.

In one embodiment of the present invention, the prioritization scheme can be implemented in conjunction with the above-described selection criteria by modifying the formula used to calculate the weighting factor W in the following manner:

$$W = (icoeff \times \text{no\_of\_ios}) +$$
$$(wcoeff \times \text{no\_of\_write\_blocks}) + (rcoeff \times \text{no\_of\_read\_blocks}) +$$
$$(PW - (pcoeff \times priority \times \text{no\_of\_ios\_of\_this\_device}))$$

The premise underlying the modified formula for the weighting factor W is that I/O operations directed to high priority target devices will appear to place an artificially high load on the paths over which they are transmitted, which will result in those paths not being subsequently selected by I/O operations directed to other lower priority target devices. As a result, the actual load on the selected paths will be lessened, thereby facilitating expedited processing of additional I/O operations directed to the high priority target device. In this respect, the weighting factor W for a particular path will not be perceived as being the same value by every next I/O operation that examines the weighting factor when selecting a path. Rather, when evaluating the load of a particular path for a next I/O operation directed to a target device N, consideration will be given to the artificial priority load placed on the path by I/O operations directed to target devices other than N, but no consideration will be given to the priority weight placed on the path by I/O operations directed to the same target device N.

The foregoing is illustrated in the above-recited formula, wherein "PW" corresponds to the total priority weight placed on the path by I/O operations directed to all target devices, "pcoeff" is a priority coefficient factoring in the weight that should be given to the priority value associated with a particular target device, "priority" is the priority value assigned to the target device that is the subject of the next I/O operation evaluating the weighting factor W, and "no__of__ios_of __this device" is the number of I/O operations pending on the path being considered that are directed to the same target device N as the next I/O operation that is evaluating the weighting factor W. Thus, the term PW represents a sum of the total artificial load placed on the path due to all prioritized I/O operations, and the parenthetical subtracted therefrom in the above-recited formula relates to the portion of the artificial load placed on the path only by the target device N that is the subject of the next I/O operation evaluating the weighting factor W.

As should be appreciated from the foregoing, when there are several high-priority I/O operations pending over a particular path, the value PW for that path will be high. For a next I/O operation that is directed to a low priority target device, the parenthetical following the value PW in the above-recited formula will be low (e.g., 0), so that little if anything will be subtracted from the high PW value. Thus, the high PW value will result in a large weighting factor W being perceived by the next I/O operation directed to the low priority target device. As a result, it is highly likely that the next I/O operation will find a lower weighting factor W on another path, and will therefore select a different path for transmitting the next I/O operation directed to the low priority device. Conversely, when the next I/O operation is directed to the same high priority target device as those pending for a particular path, the parenthetical value subtracted from PW in the above-recited formula will be large, and may even equal the total PW value. As a result, the artificial load added to the weighting factor W (as perceived by the high priority I/O operation) will be small or non-existent. Since I/O operations directed to low priority devices will have been steered away from this path by the artificial load placed on it by the high priority I/O operations, it is also likely that the real load on the path will also be small, resulting in the weighting factor W being perceived as small by the next I/O operation directed to the high priority target device. As a result, the next I/O operation will be sent to this low-traffic path and will be processed quickly.

As mentioned above, it should be appreciated that the prioritization aspect of the present invention can be implemented in numerous ways, and that the present invention is not limited to providing an artificial load in the manner described above.

In one embodiment of the present invention, the selection criteria used for balancing the activity between multiple paths can be selected by the administrator of the host computer 1. This selection can be made from any of the different selection criteria discussed above, including round robin, least operations for the selected path, least data blocks for the selected path, or an optimized routine that advantageously weights each of the above-described features of the present invention to achieve an optimized selection algorithm. As discussed above, the various aspects of the present invention are not limited to their use together in such an optimized fashion, and it should further be appreciated that when these selection criteria are weighted together, the present invention is not limited to any specific weighting factors.

It should be appreciated that each of the above-described embodiments of the present invention relating to selecting a path based upon a state of the previously assigned I/O operations queued for transmission can be implemented in straightforward fashion in the host computer 1, and that the present invention is not limited to any particular manner of implementation. For example, the processor 16 in most computer systems will include a filter driver that is responsible for distributing I/O operations among the host bus adapters 15. The filter driver can simply query each of the host bus adapters 15 to determine the status of the I/O operations queued on each, and can distribute a next I/O operation to a path meeting any of the above-described selection criteria. The filter driver can be implemented as a software program that can be stored on a computer readable medium, and can be executed on the processor 16. In this respect, it should be appreciated that one implementation of the present invention comprises a computer readable medium (e.g., a computer memory, a floppy disk, a compact disk, a tape, etc.) encoded with a computer program that, when executed on a processor, performs the above-discussed functions of the present invention. The computer readable medium can be transportable such that the program stored thereon can be loaded onto a computer system to implement the aspects of the present invention discussed above. In addition, it should be appreciated that the reference to a computer program that, when executed, performs the above-discussed functions is not limited to an application program running in application space on the host computer. Rather, the term computer program is used herein in a generic sense to reference any type of computer code (e.g., software or microcode) that can be employed to program a processor to implement the above-discussed aspects of the present invention. Alternatively, the filter driver can be provided with its own dedicated processor for executing the software program to perform the above-described path selection function, or dedicated hardware can be provided to perform this function.

In each of the embodiments the present invention described above, the aspects of the present invention are employed to balance workloads among multiple paths between a host computer and a single storage system. It should be appreciated that some computer systems can be implemented with a host computer coupled to two or more storage systems, with either a single or multiple paths extending between the host computer and each of the storage systems. It should be appreciated that the above-described aspects of the present invention can also be employed to balance workloads among paths to different storage systems. Such a computer system is described in a related application entitled METHOD AND APPARATUS FOR MANAGING DATA STORED IN A STORAGE SYSTEM TO ACHIEVE IMPROVED SYSTEM PERFORMANCE, filed on Dec. 30, 1998 and sharing at least one Applicant with the present application, and which is hereby incorporated herein by reference. Thus, the above-described aspects of the present invention relating to a method for distributing I/O operations among at least two paths in a multi-path computer system including a host computer and a system resource can be implemented wherein the system resource includes a plurality of storage systems, each coupled to the host computer via at least one communication path.

As discussed above, several embodiments of the present invention employ information relating to previously assigned I/O operations when selecting a path for transmission of a next I/O operation. In each of the embodiments described above, the information employed concerning the previously assigned I/O operations was provided solely by the host computer. In this respect, the host computer can collect and store (e.g., in the filter driver) information relating to every I/O operation transmitted to the storage system. Examples of the type of information known to the host computer for every I/O operation include the following: (1) the type of I/O operation (e.g., read or write); (2) the application that submitted the I/O operation; (3) the size of the I/O operation; (4) the logical object in application space (e.g., a file name) to which the I/O operation relates; (5) the particular logical volume targeted by the I/O operation; (6) the particular communication path used to transmit the I/O operation; (7) the number of I/O operations queued to any particular path; (8) the number of different processes or applications that send I/O operations to a particular path; (9) the type and size of the I/O operations transmitted to a particular path; and (10) the average response times for particular types of I/O operations, for particular paths, and for particular target logical volumes.

Figure 6:
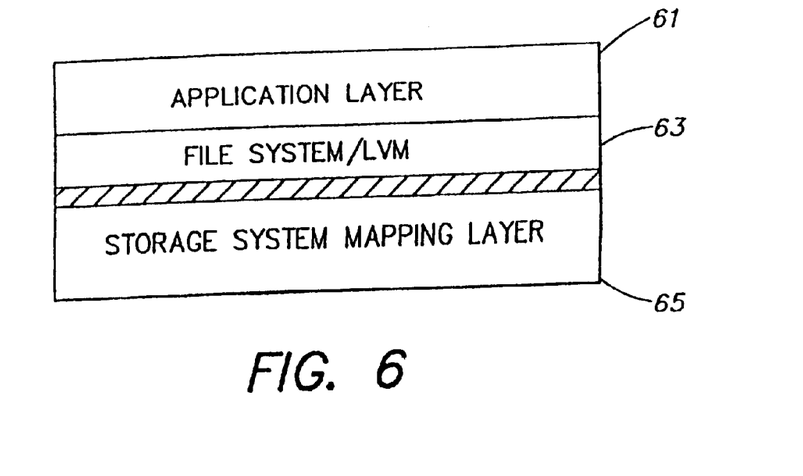
FIG. 6 is a schematic representation of a number of mapping layers that exist in known computing systems such as that disclosed in FIG. 1.

While the statistics and information that can be gathered from the perspective of the host computer 1 are extremely beneficial and can be advantageously employed as described above, it should be appreciated that when the storage system 3 is an intelligent storage system such as that shown in FIG. 1, the perspective of the host computer 1 does not illuminate the entire picture concerning the performance of the computer system. An intelligent storage system controls the location wherein data accessible via the host computer 1 is ultimately stored. Thus, the exact physical location (i.e., which one of the disk drives 5a–5b and the location on the disk drive) wherein any block of data is actually stored is transparent to the host computer. In this respect, a computer system such as that shown in FIG. 1 typically includes a plurality of layers as shown in FIG. 6.

The layers include an application layer 61 that resides on the host computer 1 and references data objects (e.g., files) used by the application. In addition, the host computer 1 also includes a file system and/or logical volume manager layer 63 that maps each data object specified by the application layer 61 to a particular logical volume, that the host computer 1 perceives to correspond to an actual physical storage device, wherein the data object is stored. Thus, if the computer system included a storage system without any intelligence, the logical volumes specified by the file system/LVM layer 63 would designate a particular physical device and a particular storage location thereon wherein the data object would be stored. Finally, the computer system further includes a storage system mapping layer 65 that resides on the storage system, and that maps from the logical volume provided from layer 63 to an actual physical location, including at least one of the disk drives 5a–5b and the physical location thereon, wherein the logical volume is stored. The mapping between a logical volume and a physical disk drive may not be 1:1, as a single logical volume can be split across multiple physical disk drives 5a–5b, or alternatively, multiple logical volumes can be stored on the same physical disk drive.

It should be appreciated that an intelligent storage system such as that shown in FIG. 3 also has the capability of creating a log of statistics concerning the I/O operations transmitted from the host computer 1 to the storage system 3. Examples of the type of information that can be logged in the storage system 3 include: (1) the path through which each I/O operation was sent; (2) the actual physical storage device (e.g., the disk drive 5a–5b) that was targeted by the I/O operation; (3) the type of I/O operation (e.g., read or write); and (4) whether the I/O operation hit or miss in the cache 11. It should be appreciated that some of this information is unavailable to the host computer 1. For example, the host computer 1 has no information concerning the actual physical storage device on which a targeted logical volume is stored. Similarly, although the host computer 1 can make an educated guess concerning whether a particular I/O operation hit or miss in the cache 11 based on the response time of the storage system, only the storage system 3 knows for certain whether a hit or miss occurred.

While the statistics that can be collected by the storage system 3 are more detailed in some areas than those that can be collected via the host computer 1, they are also lacking in other areas. In this respect, it should be appreciated that the storage system 3 typically has no information concerning the source of I/O operations at the application layer 61 (FIG. 6). Thus, although the storage system 3 can accumulate a number of statistics helpful in analyzing the raw performance of I/O operations between itself and the host computer 1, the storage system 3 generally cannot directly determine the impact of certain I/O operations on the performance of applications executing on the host computer 1.

As should be appreciated from the foregoing, maintaining performance statistics on solely the host computer 1 or the storage system 3 does not provide a complete performance picture that would be beneficial in analyzing the performance of the entire computer system in executing applications run on the host computer 1. Thus, in accordance with one illustrative embodiment of the present invention, a logging facility is provided that combines information available to the host computer 1 with information available to the storage system 3, to create a set of information that provides a more complete picture concerning the performance of the computer system. This can be done in any of numerous ways. For example, in one embodiment of the present invention, in addition to sending I/O operations to the storage system 3, the host computer 1 also transmits information relating to that I/O operation for storage in a logging facility within the storage system 3. The correlation between the information and the I/O operation can be accomplished in any of numerous ways, such as by providing an I/O tag that uniquely identifies each I/O operation and its corresponding information. The information provided by the host computer 1 can then be interleaved with the additional information that the storage system 3 can generate itself concerning the I/O operation, thereby providing overall end-to-end statistical information concerning the I/O operation. A statistical log can then be generated and stored on the storage system 3 and can be used in any of numerous ways. Alternatively, it should be appreciated that this aspect of the present invention could be implemented in the inverse manner, by transmitting information from the storage system 3 to the host computer 1 concerning each I/O operation. However, this implementation is less preferred, as the greater availability of storage space within the storage system 3 makes it a better candidate for storing the statistical log, which may grow to be of considerable size.

The aspect of the present invention relating to the creation of a statistical log can be used in any of numerous ways. In one embodiment of the invention, such a log can simply be used for mechanical analysis to provide a system administrator or system developer with a better picture of the overall performance of the computer system than is available using conventional logging techniques, which do not provide an overall picture as described above. For example, as discussed above in connection with one aspect of the present invention, for some applications, prioritizing certain I/O operations can be more important than maximizing the busyness of the storage system 3 or other system resource. Thus, conventional logging techniques that focus only on the performance of the resource can be of limited use, or can even be misleading by failing to provide meaningful information concerning the performance of the applications running on the host computer 1.

Another use for the logging subsystem is to assist in performing the load balancing aspects of the present invention described above. By providing a better overall picture of the performance of an application running on the host computer 1, the logging subsystem of the present invention can enable more intelligent decisions to be made when distributing I/O operations among the multiple paths to maximize the performance of the application. For example, the logging subsystem may assist in identifying particular I/O operations that are critical to the overall performance of the application, and should be prioritized in the manner described above. Of course, other uses of the logging subsystem can also obviously be made by the load balancing aspect of the present invention described above. Thus, in addition to providing statistical information for mechanical performance analysis, the logging subsystem aspect of the present invention can be employed as a resource by both the host computer and the storage subsystem 3 so that decision-making processes (e.g., the load balancing aspect of the present invention) running thereon can employ the information included in the logging subsystem in making decisions to achieve better system performance. Such use of the logging subsystem can be performed automatically, without the intervention of a system administrator.

In the illustrative examples discussed above, the embodiment of the present invention relating to balancing workloads among multiple paths is described in connection with multiple paths extending between a host computer and an intelligent disk drive array storage system 3 as shown in FIG. 1. However, it should be appreciated that the present invention is not limited in this respect, and that the load balancing aspects of the present invention can be employed in connection with balancing workloads to other types of storage systems (e.g., non-intelligent storage systems, tape drive storage systems, etc.), as well as to other types of computer system resources. In this respect, the load balancing aspects of the present invention can be employed to balance workloads over multiple paths between any two components of a computer system.

Having described several embodiments of the invention in detail, various modifications and improvements will readily occur to those skilled in the art. Such modifications and improvements were intended to be within the spirit and scope of the invention. Accordingly, the foregoing description is by way of example only, and is not intended as limiting. The invention is limited only as defined by the following claims and the equivalents thereto.

What is claimed is:

1. A method for distributing input/output (I/O) operations among at least two paths in a multi-path computer system including a host computer, a system resource and a plurality of paths coupling the host computer to the system resource, the method comprising a step of:

(A) for a next I/O operation to be assigned for transmission between the host computer and the system resource, selecting one of the at least two paths for transmission of the next I/O operation based upon a state of previously assigned I/O operations queued for transmission over the at least two paths;

wherein each I/O operation has an associated data access time when processed by the system resource, and wherein the step (A) includes a step of selecting the one of the at least two paths based upon the data access times of the previously assigned I/O operations queued to the at least two paths;

wherein the system resource includes at least one storage system including a cache, wherein cache hits and cache misses have different average data access times in the storage system, and wherein the step (A) includes a step of selecting the one of the at least two paths based upon a number of estimated cache hits and cache misses in the previously assigned I/O operations queued to the at least two paths.

2. The method of claim 1, wherein each of the at least two paths includes a transmission medium, and wherein the step (A) includes a step of selecting the one of the at least two paths based upon at least one characteristic of the transmission media used to implement the at least two paths.

3. The method of claim 1, wherein each of the at least two paths includes a transmission medium, wherein the transmission media used to implement the at least two paths are different, and wherein the step (A) includes a step of selecting the one of the at least two paths based upon data transmission rates through the transmission media used to implement the at least two paths.

4. The method of claim 3, wherein the step (A) includes a step of selecting the one of the at least two paths based upon arbitration times for the transmission media used to implement the at least two paths.

5. The method of claim 2, wherein each of the at least two paths includes a transmission medium, wherein the transmission media used to implement the at least two paths are different, and wherein the step (A) includes a step of selecting the one of the at least two paths based upon arbitration times for the transmission media used to implement the at least two paths.

6. The method of claim 2, wherein each I/O operation has an associated data access time when processed by the system resource, and wherein the step (A) includes a step of selecting the one of the at least two paths based upon the data access times of the previously assigned I/O operations queued to the at least two paths.

7. The method of claim 6, wherein the system resource includes at least one storage system, wherein reads from and writes to the storage system have different average data access times, and wherein the step (A) includes a step of selecting the one of the at least two paths based upon a number of reads and writes in the previously assigned I/O operations queued to the at least two paths.

8. A method for distributing input/output (I/O) operations among at least two paths in a multi-path computer system including a host computer, a system resource and a plurality of paths coupling the host computer to the system resource, the method comprising a step of:

(A) for a next I/O operation to be assigned for transmission between the host computer and the system resource, selecting one of the at least two paths for transmission of the next I/O operation based upon a state of previously assigned I/O operations queued for transmission over the at least two paths;

wherein the step (A) includes a step of selecting the one of the at least two paths based upon a number of previously assigned I/O operations queued to each of the at least two paths;

wherein each of the I/O operations queued for transmission over the at least two paths includes a number of data blocks for transmission between the host computer and the system resource, and wherein the step (A) includes a step of selecting the one of the at least two paths based upon a number of data blocks included in the previously assigned I/O operations queued to each of the at least two paths;

wherein each of the at least two paths includes a transmission medium, and wherein the step (A) includes a step of selecting the one of the at least two paths based upon at least one characteristic of the transmission media used to implement the at least two paths;

wherein each I/O operation has an associated data access time when processed by the system resource, and wherein the step (A) includes a step of selecting the one of the at least two paths based upon the data access times of the previously assigned I/O operations queued to the at least two paths; and wherein the system resource includes at least one storage system including a cache, wherein cache hits and cache misses have different average data access times in the storage system, and wherein the step (A) includes a step of selecting the one of the at least two paths based upon a number of estimated cache hits and cache misses in the previously assigned I/O operations queued to the at least two paths.

9. The method of claim 8, wherein the I/O operations are executed as part of an application program on the host computer, and wherein the method further includes a step of estimating the number of cache hits and cache misses in the previously assigned I/O operations queued to the at least two paths based upon historical performance of the application program.

10. The method of claim 9, wherein each of the I/O operations is directed to a particular target device in the storage system, and wherein the step (A) includes a step of selecting the one of the at least two paths based upon the target device of the next I/O operation.

11. The method of claim 10, wherein the step of selecting the one of the at least two paths based upon the target device of the next I/O operation includes a step of considering whether the previously assigned I/O operations queued to the at least two paths are directed to a same target device as the next I/O operation.

12. The method of claim 11, wherein the step of selecting the one of the at least two paths based upon the target device of the next I/O operation includes a step of limiting a number of the at least two paths to which a plurality of I/O operations directed to a single target device are queued simultaneously.

13. The method of claim 12, wherein the step of limiting the number of the multiple paths to which a plurality of I/O operations directed to the single target device are queued simultaneously includes a step of limiting the number of the at least two paths to a minimum number that achieves a bandwidth through the at least two paths that maximizes performance of the storage system for the target device.

14. The method of claim 13, wherein the I/O operations are executed as part of an application program on the host computer, and wherein the step (A) includes a step of selecting the one of the at least two paths based upon a priority rating for the next I/O operation, the priority rating relating to an impact that the next I/O operation has on the performance of the application program.

15. The method of claim 14, wherein the step of selecting the one of the at least two paths based upon the priority rating for the next I/O operation includes a step of:
when the next I/O operation is critical to the performance of the application program, selecting the one of the at least two paths that is expected to be the shortest path to execute the next I/O operation.

16. The method of claim 15, wherein the step of selecting the one of the at least two paths based upon the priority rating for the next I/O operation includes a step of:
when the next I/O operation is not critical to the performance of the application program, selecting the one of the at least two paths to be one of the at least two paths that is expected to not be the shortest path to execute the next I/O operation.

17. The method of claim 1, wherein each of the I/O operations queued for transmission over the at least two paths includes a number of data blocks for transmission between the host computer and the system resource, and wherein the step (A) includes a step of selecting the one of the at least two paths based upon a number of data blocks included in the previously assigned I/O operations queued to each of the at least two paths.

18. A method for distributing input/output (I/O) operations among at least two paths in a multi-path computer system including a host computer, a system resource and a plurality of paths coupling the host computer to the system resource, the method comprising a step of:

(A) for a next I/O operation to be assigned for transmission between the host computer and the system resource, selecting one of the at least two paths for transmission of the next I/O operation based upon a state of previously assigned I/O operations queued for transmission over the at least two paths;
wherein each of the I/O operations is directed to a particular target device in the system resource, and wherein the step (A) includes a step of selecting the one of the at least two paths based upon the target device of the next I/O operation.

19. The method of claim 18, wherein the step of selecting the one of the at least two paths based upon the target device of the next I/O operation includes a step of considering whether the previously assigned I/O operations queued to the at least two paths are directed to a same target device as the next I/O operation.

20. The method of claim 18, wherein the step of selecting the one of the at least two paths based upon the target device of the next I/O operation includes a step of limiting a number of the at least two paths to which a plurality of I/O operations directed to a single target device are queued simultaneously.

21. A host computer capable of use in a multi-path computer system including a system resource and a plurality of paths coupling the host computer to the system resource, the host computer comprising:
a driver to distribute input/output (I/O) operations initiated by the host computer among at least two of the plurality of paths for transmission to the system resource, the driver selecting, for a next I/O operation to be assigned for transmission from the host computer to the system resource, one of the at least two paths based upon a state of previously assigned I/O operations queued for transmission to the system resource over the at least two of the plurality of paths;
wherein each I/O operation has an associated data access time when processed by the system resource, and wherein the driver selects the one of the at least two of the plurality of paths based upon the data access times of the previously assigned I/O operations queued to the at least two of the plurality of paths; and
wherein the system resource is a storage system including a cache, wherein cache hits and cache misses have different average data access times in the storage system, and wherein the driver selects the one of the at least two of the plurality of paths based upon a number of estimated cache hits and cache misses in the previously assigned I/O operations queued to the at least two of the plurality of paths.

22. The host computer of claim 21, wherein each of the at least two of the plurality of paths includes a transmission medium, and wherein the driver selects the one of the at least two of the plurality of paths based upon at least one characteristic of the transmission media used to implement the at least two of the plurality of paths.

23. The host computer of claim 21, wherein each of the at least two of the plurality of paths includes a transmission medium, wherein the transmission media used to implement the at least two of the plurality of paths are different, and wherein the driver selects the one of the at least two of the plurality of paths based upon a data transmission rate through the transmission media used to implement the at least two of the plurality of paths.

24. The host computer of claim 23, wherein the driver selects the one of the at least two of the plurality of paths based upon an arbitration time for the transmission media used to implement the at least two of the plurality of paths.

25. The host computer of claim 22, wherein each of the at least two of the plurality of paths includes a transmission medium, wherein the transmission media used to implement the at least two of the plurality of paths are different, and wherein the driver selects the one of the at least two of the plurality of paths based upon an arbitration time for the transmission media used to implement the at least two of the plurality of paths.

26. The host computer of claim 22, wherein each I/O operation has an associated data access time when processed by the system resource, and wherein the driver selects the one of the at least two of the plurality of paths based upon the data access times of the previously assigned I/O operations queued to the at least two of the plurality of paths.

27. The host computer of claim 26, wherein the system resource includes at least one storage system, wherein reads from and writes to the storage system have different average data access times, and wherein the driver selects the one of the at least two of the plurality of paths based upon a number of reads and writes in the previously assigned I/O operations queued to the at least two of the plurality of paths.

28. A host computer capable of use in a multi-path computer system including a system resource and a plurality of paths coupling the host computer to the system resource, the host computer comprising:
- a driver to distribute input/output (I/O) operations initiated by the host computer among at least two of the plurality of paths for transmission to the system resource, the driver selecting, for a next I/O operation to be assigned for transmission from the host computer to the system resource, one of the at least two paths based upon a state of previously assigned I/O operations queued for transmission to the system resource over the at least two of the plurality of paths;
- wherein the driver selects the one of the at least two of the plurality of paths based upon a number of previously assigned I/O operations queued to each of the at least two of the plurality of paths;
- wherein each of the I/O operations queued for transmission over the at least two of the plurality of paths includes a number of data blocks for transmission between the host computer and the system resource, and wherein the driver selects the one of the at least two of the plurality of paths based upon a number of data blocks included in the previously assigned I/O operations queued to each of the at least two of the plurality of paths;
- wherein each of the at least two of the plurality of paths includes a transmission medium, and wherein the driver selects the one of the at least two of the plurality of paths based upon at least one characteristic of the transmission media used to implement the at least two of the plurality of paths;
- wherein each I/O operation has an associated data access time when processed by the system resource, and wherein the driver selects the one of the at least two of the plurality of paths based upon the data access times of the previously assigned I/O operations queued to the at least two of the plurality of paths; and
- wherein the system resource includes at least one storage system including a cache, wherein cache hits and cache misses have different average data access times in the storage system, and wherein the driver selects the one of the at least two of the plurality of paths based upon a number of estimated cache hits and cache misses in the previously assigned I/O operations queued to the at least two of the plurality of paths.

29. The host computer of claim 28, wherein the I/O operations are executed as part of an application program on the host computer, and wherein the driver estimates the number of cache hits and cache misses in the previously assigned I/O operations queued to the at least two of the plurality of paths based upon historical performance of the application program.

30. The host computer of claim 29, wherein each of the I/O operations is directed to a particular target device in the storage system, and wherein the driver selects the one of the at least two of the plurality of paths based upon the target device of the next I/O operation.

31. The host computer of claim 30, wherein the driver considers whether the previously assigned I/O operations queued to the at least two of the plurality of paths are directed to a same target device as the next I/O operation.

32. The host computer of claim 31, wherein the driver limits a number of the at least two of the plurality of paths to which a plurality of I/O operations directed to a single target device are queued simultaneously.

33. The host computer of claim 32, wherein the driver limits the number of the at least two of the plurality of paths to a minimum number that achieves a bandwidth through the at least two of the plurality of paths that maximizes performance of the storage system for the target device.

34. The host computer of claim 33, wherein the I/O operations are executed as part of an application program on the host computer, and wherein the driver selects the one of the at least two of the plurality of paths based upon a priority rating for the next I/O operation, the priority rating relating to an impact that the next I/O operation has on the performance of the application program.

35. The host computer of claim 34, wherein when the next I/O operation is critical to the performance of the application program, the driver selects the one of the at least two of the plurality of paths that is expected to be the shortest path to execute the next I/O operation.

36. The host computer of claim 35, wherein when the next I/O operation is not critical to the performance of the application program, the driver selects the one of the at least two of the plurality of paths to be one of the at least two of the plurality of paths that is expected to not be the shortest path to execute the next I/O operation.

37. The host computer of claim 21, wherein each of the I/O operations queued for transmission over the at least two of the plurality of paths includes a number of data blocks for transmission between the host computer and the system resource, and wherein the driver selects the one of the at least two of the plurality of paths based upon a number of data blocks included in the previously assigned I/O operations queued to the at least two of the plurality of paths.

38. A host computer capable of use in a multi-path computer system including a system resource and a plurality of paths coupling the host computer to the system resource, the host computer comprising:
- a driver to distribute input/output (I/O) operations initiated by the host computer among at least two of the plurality of paths for transmission to the system resource, the driver selecting, for a next I/O operation to be assigned for transmission from the host computer to the system resource, one of the at least two paths based upon a state of previously assigned I/O operations queued for transmission to the system resource over the at least two of the plurality of paths;
- wherein each of the I/O operations is directed to a particular target device in the system resource, and wherein the driver selects the one of the at least two of the plurality of paths based upon the target device of the next I/O operation.

39. The host computer of claim 38, wherein the driver considers whether the previously assigned I/O operations queued to the at least two of the plurality of paths are directed to a same target device as the next I/O operation.

40. The host computer of claim 38, wherein the driver limits a number of the at least two of the plurality of paths to which a plurality of I/O operations directed to a single target device are queued simultaneously.

41. The host computer of claim 21, wherein the driver includes means for selecting the one of the at least two of the plurality of paths based upon the state of previously assigned I/O operations queued for transmission to the system resource over the at least two of the plurality of paths.

42. The host computer of claim 21, wherein the host computer includes a processor, and wherein the driver is a software driver executing on the processor.

43. The host computer of claim 21, in combination with the system resource and the multiple paths to form the multi-path computer system.

44. A computer readable medium encoded with a program that, when executed on a host computer, performs the method according to claim 2.

45. The host computer of claim 28, in combination with the system resource and the multiple paths to form the multi-path computer system.

46. The host computer of claim 38, in combination with the system resource and the multiple paths to form the multi-path computer system.

47. The host computer of claim 21, in combination with the system resource and the multiple paths to form the multi-path computer system.

48. A computer readable medium encoded with a program that, when executed on a host computer, performs the method according to claim 8.

49. A computer readable medium encoded with a program that, when executed on a host computer, performs the method according to claim 18.

50. A computer readable medium encoded with a program that, when executed on a host computer, performs the method according to claim 1.

* * * * *